US005724457A

United States Patent [19]
Fukushima

[11] Patent Number: 5,724,457
[45] Date of Patent: Mar. 3, 1998

[54] CHARACTER STRING INPUT SYSTEM

[75] Inventor: Toshikazu Fukushima, Tokyo, Japan

[73] Assignee: NEC Corporation, Tokyo, Japan

[21] Appl. No.: 457,834

[22] Filed: Jun. 1, 1995

[30] Foreign Application Priority Data

Jun. 6, 1994 [JP] Japan ................................. 6-123415

[51] Int. Cl.⁶ ............................... G06K 9/03; G06K 9/00
[52] U.S. Cl. ................................. 382/311; 382/187
[58] Field of Search ................................. 382/309, 310,
382/311, 185, 186, 187, 188, 189, 229,
231, 159, 161

[56] References Cited

U.S. PATENT DOCUMENTS

| 4,330,845 | 5/1982 | Damerau | 382/311 |
| 5,315,667 | 5/1994 | Fujisaki et al. | 382/311 |

FOREIGN PATENT DOCUMENTS

| 58-155443 | 9/1983 | Japan | G06F 3/02 |
| 59-208639 | 11/1984 | Japan | G06F 3/02 |
| 61-11891 | 1/1986 | Japan | G06K 9/66 |
| 63-49264 | 10/1988 | Japan | G06F 15/20 |
| 2-16671 | 1/1990 | Japan | G06F 15/20 |
| 2-177726 | 7/1990 | Japan | G06F 15/20 |

OTHER PUBLICATIONS

J. Darragh et al., "The Reactive Keyboard: a Predictive Typing Aid", Computer, 1990, pp. 41–49.

Primary Examiner—Leo Boudreau
Assistant Examiner—Wenpeng Chen
Attorney, Agent, or Firm—Foley & Lardner

[57] ABSTRACT

A character string input system includes a direct character string buffer 50 storing character coded direct character string, a character string predicting portion 60 generating a predicted character string immediately following character string in the direct character string buffer 50, a predicted character string buffer 70 storing the predicted character string generated by the character string predicting portion, a display control portion 100 and a display portion 110 for displaying the direct character string stored in the direct character string buffer 50 and the predicted character string stored in the predicted character string buffer 70, a selection command input portion 30 for selecting a desired character string among the predicted character strings stored in the predicted character string, and a learning control portion 130 and a learning portion 140 storing hysteresis information which is made reference to upon generation of the character string candidates by the character string predicting portion 60 with use of the hysteresis information.

18 Claims, 16 Drawing Sheets

CHARACTER STRING INPUT SYSTEM

BACKGROUND OF THE INVENTION

1. Field of the Invention

The present invention relates generally to a character string input system for inputting a character string to an electronic devices, such as a personal computer, wordprocessor and so forth. More specifically, the invention relates to a character string input system for inputting a character string for handwritten characters utilizing a character recognition technology.

2. Description of the Related Art

As one of various methods for inputting a character string to an electronic device or equipment, such as a personal computer, a wordprocessor and so forth, there is a method to input a character as an image data by means of a tablet, a touch panel, a mouse and so forth, and then to convert the input character image into a character code by character recognition. Such a manner of input method utilizing character recognition is convenient particularly for those who are not qualified in keyboard input, since it does not require special skill in typing. Also, down-sizing of such type of an input device is relatively easy, it is suitable for an application for a hand-held type terminal device, and so forth. On the other hand, the input method employing character recognition has a drawback in low input speed. Furthermore, when the handwritten character cannot be recognized accurately to make it impossible to determine the input character in a straightforward manner, the operator has to select a correct one from a plurality of nominated possible characters. Such operation is cumbersome and further slows down the input speed.

Therefore, in the prior art, there are various means for compensating such defects that have been employed.

For instance, Japanese Examined Patent Publication (Kokoku) No. Showa 63-49264, entitled "Character Recognition and Kana-Kanji Conversion System" has been disclosed. "Kana" represents a Japanese character normally called as "Hiragana" and "Kanji" represents a Chinese character. The disclosed system is directed for handwritten input of Japanese characters, in which the "Kana" character is input, and the input "Kana" character or characters are converted into the "Kanji" character. In general, the "Kana" character of Japanese characters is simpler than the "Kanji" characters in structure. Therefore, employment of such "Kana-Kanji Conversion" technology may improve input efficiency.

On the other hand, Japanese Unexamined Patent Publication (Kokai) No. Showa 61-11891, entitled "Handwritten Character Pattern Recognition System" discloses a technology for character string input of Japanese characters in "Kanji" character expression. In particular, the disclosed system preliminarily registers complicated "Kanji" characters and frequently used "Kanji" character with correspondence to the handwritten pattern for inputting the registered characters. In Japanese Unexamined Patent Publication No. Showa 59-208639, entitled "Document Drafting System" and Japanese Unexamined Patent Publication No. Heisei 2-177726, entitled "Kanji Input System", there are disclosed technologies for inputting a "Bushu", which is a meaningful fraction of a "Kanji" character separated according to a predetermined rule, as a pattern easy to be input, and then inputting the "Kanji" having the input "Bushu".

Also, Japanese Unexamined Patent Publication No. 2-16671, entitled "Document Drafting Aiding System" discloses a system in which a correspondence table defining an abbreviated form character string for a predetermined character string is provided for retrieving a character string corresponding to the input in incomplete form character string from the correspondence table to convert into the desired character string. As a similar technology, Japanese Unexamined Patent Publication No. Showa 58-155443, entitled "Japanese Language Input System" discloses a technology to input a front part of a word and an incomplete input indicative sign to display words having front part matching therewith to permit the user to select the desired word.

However, the foregoing conventional document input means requires to preliminarily register the words and incomplete form thereof to make preparation cumbersome. Also, incomplete input is permitted to use only the given number of leading characters.

Also, in all of the foregoing systems, it is required to input at least a part of the "Kanji" character or the reading thereof, and so a desired shortening of an input period cannot be expected.

SUMMARY OF THE INVENTION

Therefore, it is a first object of the present invention to provide a character string input system which permits incomplete input of a target character string in a handwriting character string input means, for shortening a period required for inputting and reducing work load on a user in inputting a character string.

A second object of the present invention is to provide a character string input system which permits incomplete input of a target character string in a handwriting character string and so as to avoid influence of a precision of a character recognition for the part neglected from input.

A third object of the present invention to provide a character string input device which permits incomplete input of a target character string in a handwriting character string and thus can avoid an erroneous character to be contained due to erroneous memory of one or more characters for the part supplemented by the interpolation or extrapolation.

According to the first aspect of the invention, a character string input system comprises:

direct character string storage means for storing character coded direct character string;

character string predicting means for generating predicted character strings immediately following the character string stored in the direct character string storage means;

predicted character string storage means for storing predicted character strings generated by the character string predicting means;

display means for displaying the direct character string stored in the direct character string storage means and predicted character strings stored in the predicted character string storage means;

character string selection means for selecting desired one of predicted character string among those stored in the predicted character string storage means; and learning means for strong result of selection process by the character string selection means as hysteresis information to be made reference upon generation of candidate character strings by the character string predicting means.

According to the second aspect of the invention, a character string input system comprises:

3 handwriting character input means for sampling trace data of handwritten character;

character recognizing means for recognizing character of the sampled trace data to derive corresponding character code;

direct character string storage means for storing character coded direct character string;

character string predicting means for generating predicted character strings immediately following the character string stored in the direct character string storage means;

predicted character string storage means for storing predicted character strings generated by the character string predicting means;

display means for displaying the direct character string stored in the direct character string storage means and predicted character strings stored in the predicted character string storage means;

character string selection means for selecting desired one of predicted character string among those stored in the predicted character string storage means; and learning means for strong result of selection process by the character string selection means as hysteresis information to be made reference upon generation of candidate character strings by the character string predicting means.

The hysteresis information stored in the learning means is a character string, in which the direct character string stored in the direct character string storing means and the character string stored in the predicted character string storage means and selected by the character string selection means by a selection command, are combined.

The character string selection means may be a selection command input means for inputting a selection command selecting an arbitrary character string among predicted character strings stored in the predicted character string storage means. The display means may have a first display region displaying the direct character string stored in the direct character string storage means and a second display region displaying predicted character string stored in the predicted character string storage means. The display means may display a character string selected by the character string selection means among candidate character string stored in the predicted character string storage means at a position immediately following the direct character string displayed in the first display region.

The display means may display the predicted character string stored in the predicted character string storage means at a position immediately following the direct character string stored in the direct character string storage means. The character string selection means may be selection command input means for inputting a selection command selecting arbitrary character string among predicted character strings stored in the predicted character string storage means. The character string selection means may select a predicted character string up to the position immediately before the trace data us input as the character string following to the direct character string when inputting of the trace data of new handwritten character is made in overwriting on the predicted character string displayed on the display means.

The character string selection means includes selection command input means for inputting a selection command for selecting arbitrary character string among predicted character strings stored in the predicted character string storage means, and the character string selection means selects a predicted character string up to the position immediately before the trace data us input as the character string following to the direct character string when inputting of the trace data of new handwritten character is made in overwriting on the predicted character string displayed on the display means.

4

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings.

DESCRIPTION OF THE PREFERRED EMBODIMENT

The present invention will be discussed in detail in terms of the preferred embodiment with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order to more clearly describe the present invention.

Figure 1:
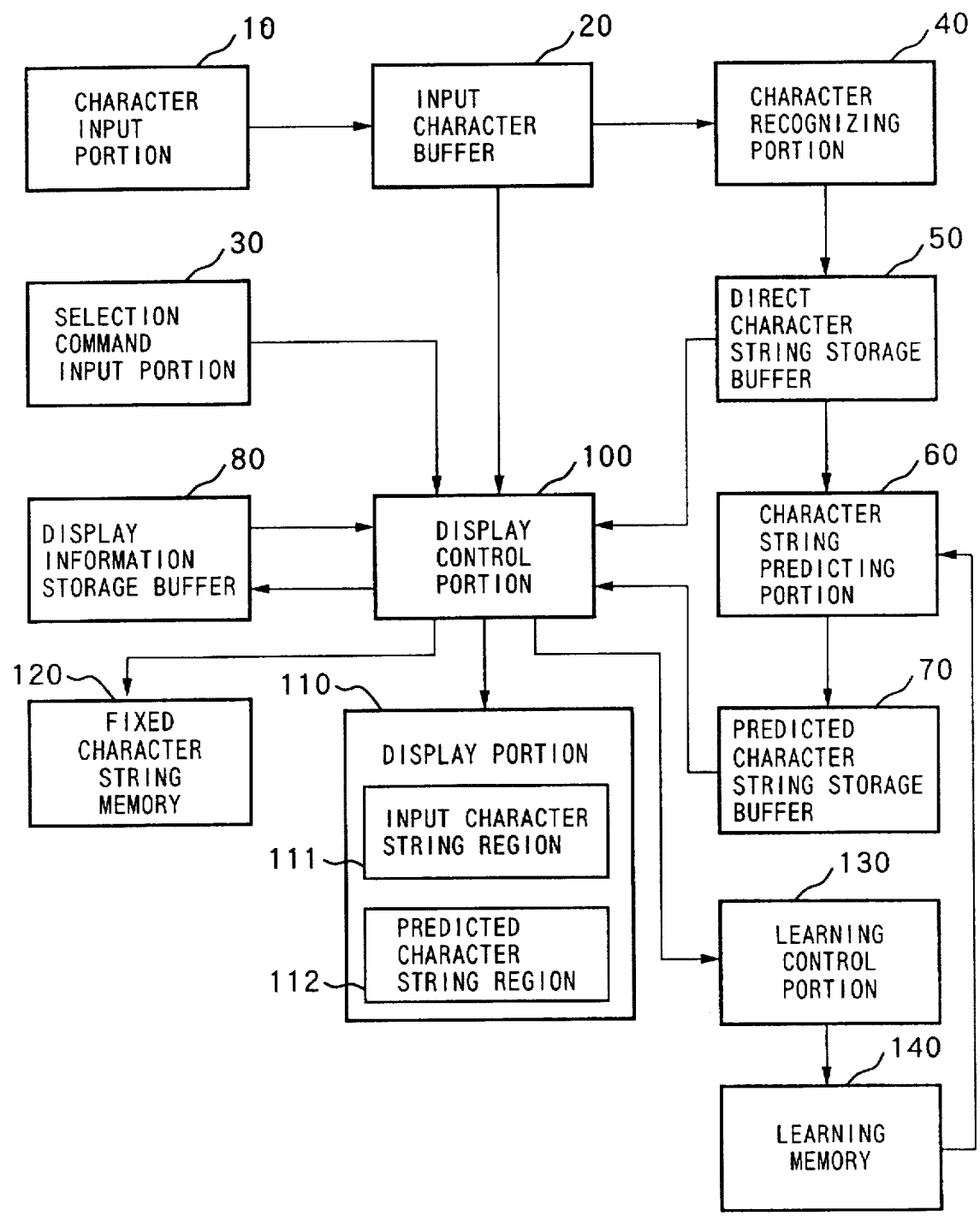
FIG. 1 is a block diagram of the first embodiment of a character string input device according to the present invention.

FIG. 1 is a block diagram showing the first embodiment of a character string input system according to the present invention.

As shown in FIG. 1, the shown embodiment of the character string input system comprises a character string input portion 10 for inputting a character string, an input character buffer 20 for temporarily storing the input character string, a selection command input portion 30 for inputting a command for selection and instruction, a character recognizing portion 40 for performing character recognition of the input character, a direct character string storage buffer 50 for storing the recognized character string, a character string predicting portion 60 for predicting a character string following to the character string stored in the direct character string storage buffer 50, a predicted character string storage buffer 70 for storing predicted candidates of character strings, a fixed character string memory 120 for storing fixed character string, a learning control portion 130 and learning memory 140 for learning the fixed result of the character string, a display information storage buffer 80 for displaying character string, for which input character string processing is completed, a display control portion 100 and a display portion 110. It should be noted that FIG. 1 illustrates only elements necessary for processing input of the character string and elements not directly contributing for character string inputting process have been neglected. For instance, in the practical construction, the system may further include a word dictionary, a spelling verification function, grammar verification function and so forth.

The character string input portion 10 receives a trace data or pattern data of a handwritten character. The character string input portion 10 may be realized by a pointing device and a plane which may detect the pointing position as a two-dimensional coordinate data. In the already commercialized pen type computer, the character string input portion 10 has been realized by a stylus pen and a tablet. Also, the character string input portion 10 may be realized by pointing on a touch panel by a finger, or by employing a mouse as the pointing device.

The input character buffer 20 is a buffer storing trace data sampled by the character string input portion 10. The input character buffer 20 may be realized by a storage device, such as an IC memory. The trace data may be expressed by x-coordinate, y-coordinate and time in the buffer.

The selection command input portion 30 is designed for inputting a command for selection or verification. As the input means, means for inputting a command by depressing a predetermined key in the keyboard, means utilizing the physically same device to the character string input portion 10 for inputting the command by pointing to a specific region, and so forth may be employed.

The character recognizing portion 40 performs character recognition for the trace data stored in the input character buffer 20 and derives a character code corresponding thereof. The character recognizing portion 40 may be realized with a handwritten character recognizing portion of the pen computer. The basic flow of the character recognition process is that, at first the characteristic amount is extracted from the trace data, and then the derived characteristic amount is compared with the similar characteristic amount preliminarily obtained with respect to standard characters as objects for recognition, and a closest one is determined as the result of recognition. When the candidate character as the result of recognition becomes more than one and cannot be restricted to one, reference is made to the word dictionary as a combination with the leading and trailing characters. Furthermore, by checking grammatical connection, most probable candidate character may be selected in the light of language constructs.

The direct character string storage buffer 50 is a buffer for storing the character string encoded into the character code by the character recognizing portion 40. The direct character string storage buffer 50 may be realized by a storage device, such as an IC memory or so forth. Hereinafter, the input character string to be stored in the direct character string storage buffer 50 will be referred to as a "direct character string". The direct character string storage buffer 50 may store the direct character string associating with the order of input and input position. When the recognition result cannot be determined in a straightforward manner in the character recognizing portion 40, it may be possible to store a plurality of candidate characters.

The character string predicting portion 60 generates candidate characters immediately following the direct character string in the direct character string storage buffer 50. By retrieving word forward matching with the direct character string from the word dictionary, the prediction of the word level can be realized. Namely, by taking the word matching with the direct character string in a forward portion from the word dictionary. Then, the remaining portion of the taken out word matching at the front portion after removal of the matched characters should be the predicted character string. When a plurality of candidates of the character string is present, all of those character strings should become the candidates of the character string.

On the other hand, the character string predicting portion 60 also makes reference to learnt information upon generation of the candidates characters when process history in past character string inputting processes is stored as learned information. When a character string partially matching with the direct character string of a current process is present in the learning memory 140, prediction of the character string is performed according to the learnt information. When the corresponding character string is present in the learnt memory 140, it may be possible to preferentially take the result of the most recent process as predicted character string or, in the alternative, to unitarily generate the predicted character string by combining the history information stored in the learning memory 140 and the information in the word dictionary.

Figure 2:
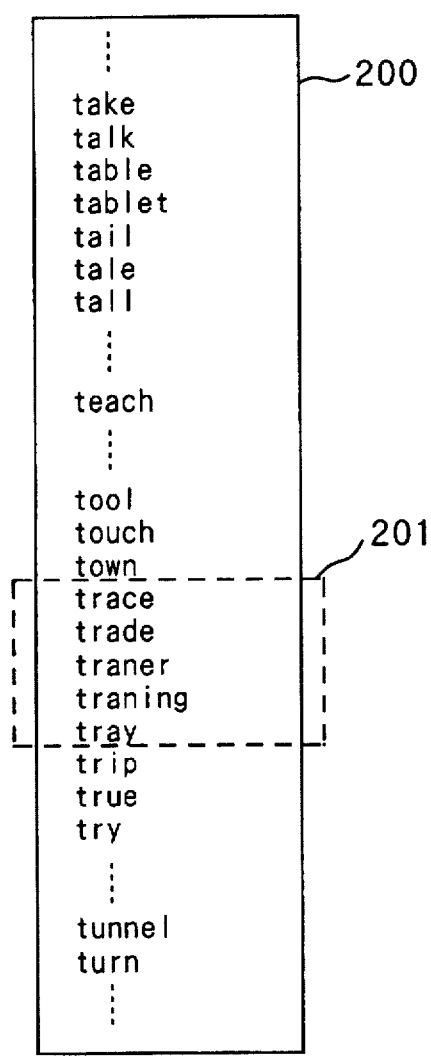
FIG. 2 is an illustration showing a content of a word dictionary to be employed in the first embodiment of the character string input device of FIG. 1.
Figure 3:
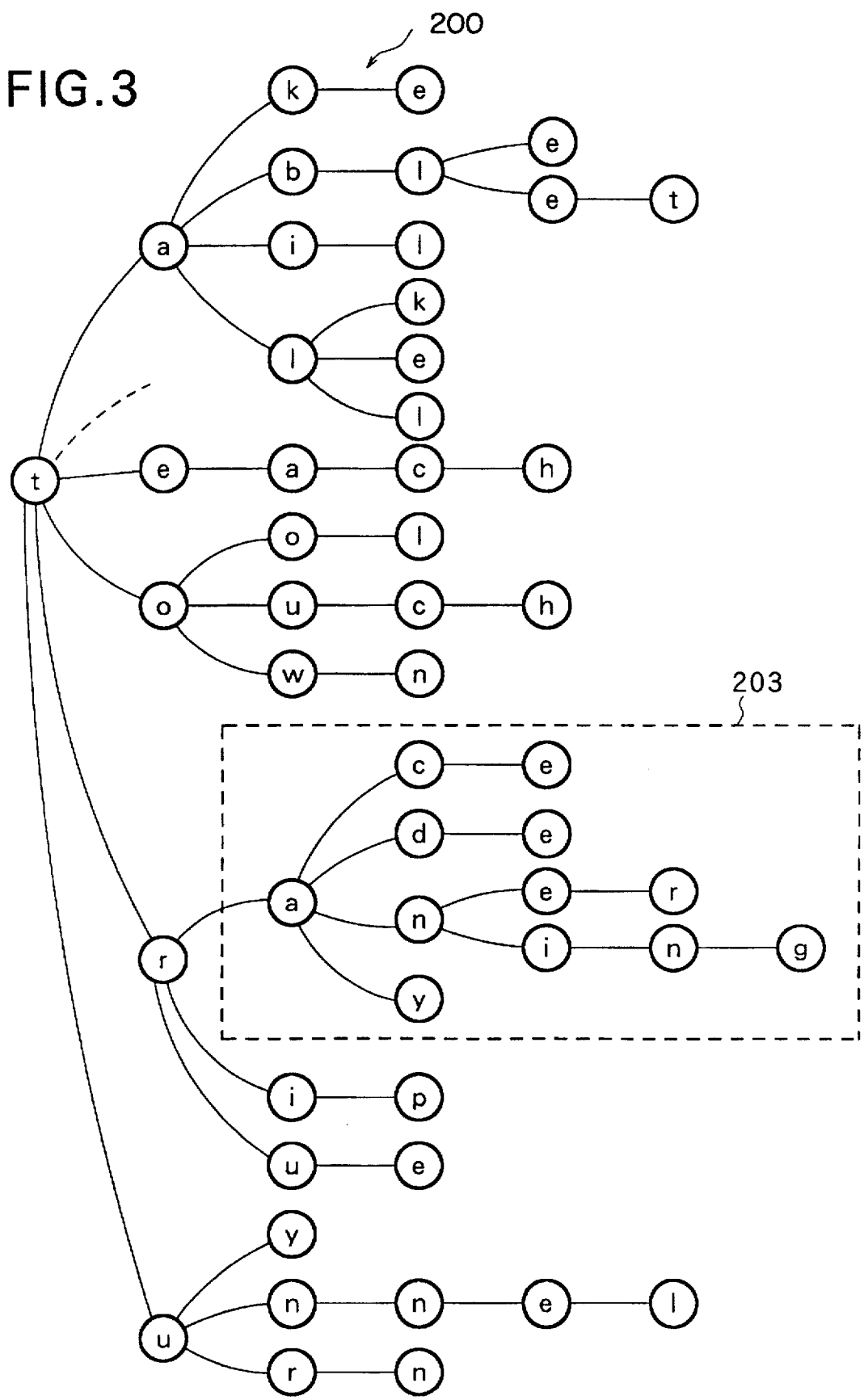
FIG. 3 is an illustration showing a structure of the word dictionary to be employed in the first embodiment of the character string input device of FIG. 1.

FIG. 2 shows an example of a word dictionary 200. In FIG. 2, the words are ordered according to the order of the character code. For instance, when the direct character is "tra", the forward matching words thereof are "trace", "trade", "traner", "training", "tray" in the enclosed range 201 by the broken line. Accordingly, as the predicted character strings with respect to the direct character "tra", the predicted character strings "ce", "de", "ner", "ning" and "y" may be generated. For retrieving matching of the forward portion, a digit retrieval type as shown in FIG. 3 is effective as the structure of the word dictionary. When the digit retrieval type word dictionary 200 as illustrated in FIG. 3 is employed, by restricting retrieving range from the first character to second character in the word dictionary 200, the subsequent characters becomes candidates of the character string. Namely, the predicted character string with respect to "tra" can be obtained as a region 203.

The predicted character string storage buffer 70 is a buffer for storing the candidate character strings generated by the character string predicting portion 60. The predicted character string storage buffer 70 may be realized by a storage device, such as an IC memory and so forth. In the predicted character string storage buffer 70, the predicted character strings are stored as character code strings. If there is a possibility to have a plurality of predicted character strings, those of a plurality of predicted character string candidates are all stored as the candidates of the predicted character string. Then, when an order corresponding to the certainty among a plurality of the predicted character strings can be set, the predicted character string may be ordered in that order. In the alternative, it may also be possible to add the order information for respective predicted character strings.

The display device 110 can be realized by a CRT display or a liquid crystal display and so forth. On the other hand, like the recent pen computer and so forth, it may be possible to employ a liquid crystal table which functions as both of the tablet as the character string input portion 10 and the liquid crystal display. Also, when the touch screen is employed as the character string input portion 10, the character string input portion 10 and the display portion 110 may be realized a physically integrated fashion. In the shown embodiment, the display portion 110 defines an input character string region 111 and a predicted character string region 112.

The display information storage buffer 80 is a buffer for storing information to be displayed on the display portion 110. The display information storage buffer 80 may be realized by a storage device, such as an IC memory. The displayed information is the content to be displayed, the position to display and its attribute (color and so forth).

The display control portion 100 is a means for forming the content of the display information storage buffer 80 on the basis of the contents of the input character buffer 20, direct character string storage buffer 50 and the command from the selection command input portion 30 and controlling the display content of the display portion 110. In concrete, the display control portion 100 performs controls through the following processes. At first, the trace data in the input character buffer 20 is temporarily displayed in the input character string region 111 of the display portion 110. When the operation of the character recognizing portion 40 is completed, in place of the temporarily stored trace data, the character string corresponding to the content of the direct character string storage buffer 50 is re-displayed on the input character string region 111. On the other hand, in the predicted character string region 112, the candidates of the character string are displayed. Then, from the selection command input portion 30, the command for selection is input to the display portion 110. Then, at the trailing end of the input character string in the input character string region 111, the candidate of the selected character string is added so as to be displayed together with the front portion.

The fixed character string memory 120 stores the character string displayed in the input character string region 111 of the display portion 110 as the fixed character string and thus accumulates the fixed character strings. Such fixed character string memory 120 may be realized by a storage device, such as an IC memory or so forth. The amount of the character strings to be displayed on the input character string region 111 is limited depending upon the size of the display portion 110 and cannot display the whole document. Therefore, the fixed character strings are accumulated in the fixed character string memory 120 from time to time.

The learning control portion 130 stores process history of the character inputting process in the shown embodiment. The learning control portion 130 may be realized by a program-controlled CPU or so forth. In concrete terms, when a desired character string is selected among the predicted character strings and fixed as an input character string, the corresponding character string in the predicted character string buffer 70 and the corresponding partial character string in the direct character string 50 are combined and written in the learning memory 140 as a combined character string. In the shown embodiment, the fact that the desired character string is selected among the predicted character strings and fixed as an input character string, is detected by receiving the command input indicative that the character string is selected and fixed, from the selection command input portion 30. The learning control portion 130 receives data, such as the predicted character string, the selection command, the direct character string and so forth via the display control portion 100.

The learning memory 140 maintains a process history written by the learning control portion 130. The learning memory 140 may be realized by a storage device, such as an IC memory and so forth. When the character string predicting portion 60 generates the predicted character strings, the character strings recently used are preferentially generated with reference to the learning memory 140 for more efficient process.

Figure 4:
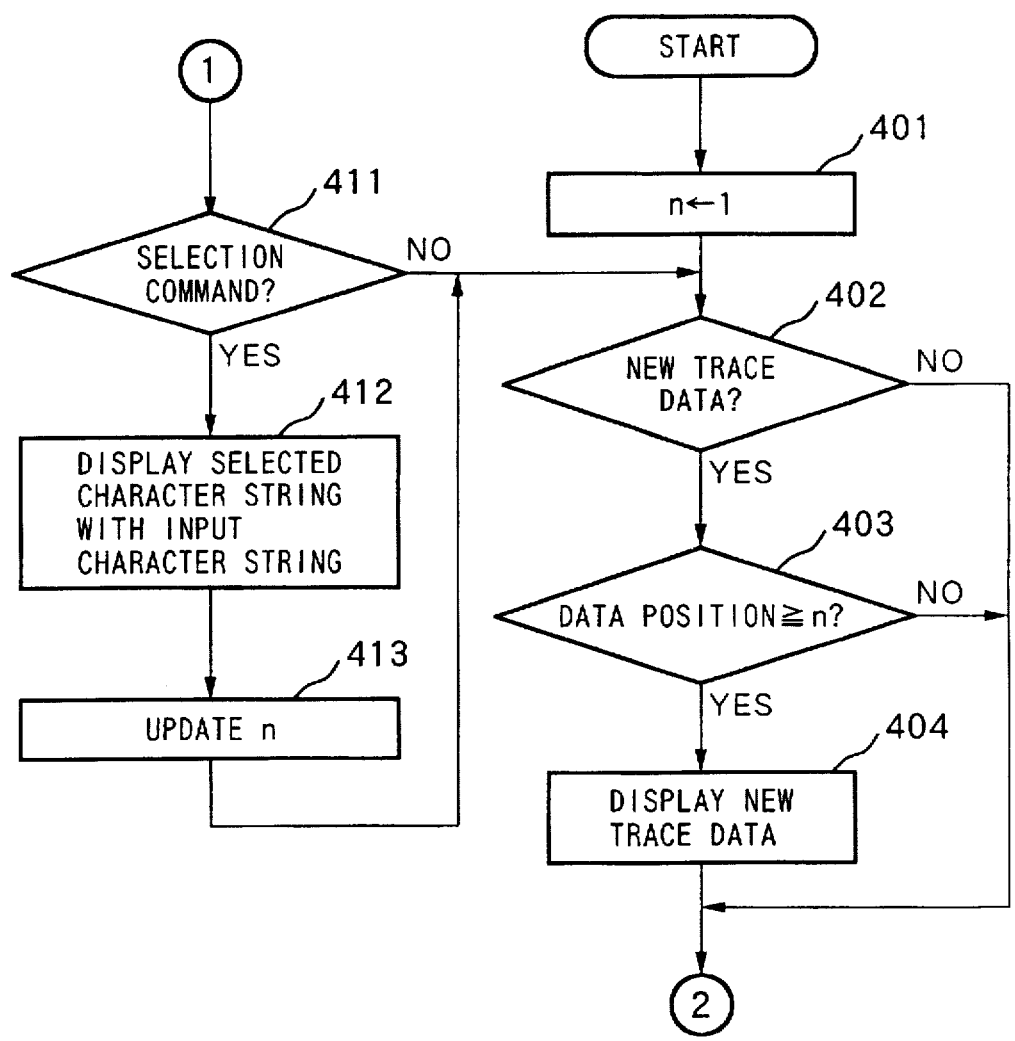
FIGS. 4 and 5 are separate portions of a flowchart showing an operation of the first embodiment of the character string input system.

Next, the operation of the display control device 100 will be discussed with reference to the flowcharts of FIGS. 4 and 5.

In the drawings, the reference sign n represents a value indicative of the character concerned. Namely, when n=1, it represents the first character in the input character string region 111 of the display portion 110.

At first, in the display control portion 100, the sign n is initially set at a value 1 (step 401). Then, the character input is performed by the character input portion 10, and a fresh trace data is stored in the input character buffer 20. Then, the display control portion 100 checks the position of the trace data (steps 402 and 403). Then, if the position of the trace data is the position of the nth character concerned or lower order than the nth character, the trace data is displayed on the input character string region 111 of the display portion 110 (step 404).

Subsequently, by the character recognition portion 40, character recognition is performed to store a new character in the direct character string storage buffer 50. Then the display control portion 100 displays the new character on the input character string region 111 in place of the trace data (steps 405 and 406). At this time, the character string predicting portion 60 performs prediction for the character following the new character to store the predicted character in the predicted character string storage buffer 70.

Then, the display control portion 100 sets the character concerned to the character next to that currently concerned. Then the candidate of the character string including the currently concerned character and the subsequent characters is read out from the predicted character string storage buffer 70 (steps 407 and 408). Then, the read out predicted character string is displayed on the predicted character string region 112 of the display portion 110 (steps 409 and 410).

With respect to the predicted character string displayed on the predicted character string region 112, if a selection command is entered for the appropriate character string candidate from the selection command input portion 30, the display control portion 100 adds the selected predicted character string to the character string displayed on the input character string region 111 at the position of the character concerned and the subsequent character position (step 412). Then, the value indicative of the character position to be concerned is updated by adding the length of the newly added character string. Then, process waits for the new trace data (step 413).

The operation set forth above will be discussed in more concrete manner with reference to FIGS. 6(A) to 6(F).

Figure 6A:
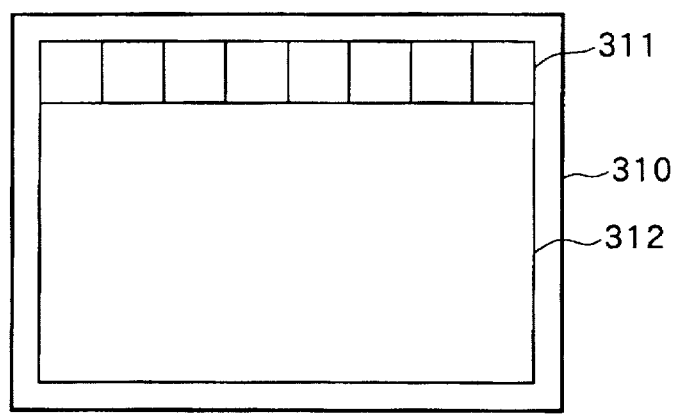
FIGS. 6A to 6F are illustration showing display in inputting character string.

FIG. 6(A) shows the condition where nothing is input. As can be seen, the input character string region 111 and the predicted character string region 112 are provided as separate regions in the display control portion 100. At this time, the word "trading" is assumed to be input. The process of inputting the character will be discussed.

Figure 6B:
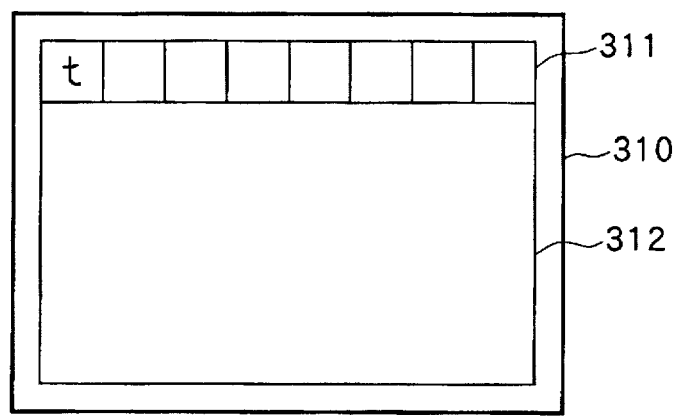

In FIG. 6(B), a character "t" is written in by handwritten form. This is the state where the trace data is input to the input character buffer 20 from the character input portion 10 and stored therein, which is displayed through the operation at the step 404 of FIG. 4.

When one handwritten character is entered, as the result of process in the character recognition portion 40, the character code of "t" is stored in the direct character string storage buffer 50. At this stage, the answer at the step 405 of FIG. 5, becomes positive. Then, by the step 406, in place of the handwritten character "t" displayed, the encoded character code "t" is displayed on the input character string region 111.

Thereafter, by the character string predicting portion 60, the character string subsequent to "t" is predicted. Then, the candidate character string or character strings are stored in the predicted character string storage buffer 70. At this stage, the process is advanced to steps 409 and 410 of FIG. 5. On the predicted character string region 112, the candidate character strings subsequent to "t" are displayed. The display at this condition is as illustrated in FIG. 6(C). At this stage, one of the candidate character strings in the predicted character string region 112 may be selected. However, the following discussion will be given for the case where selection is not made.

Figure 6C:
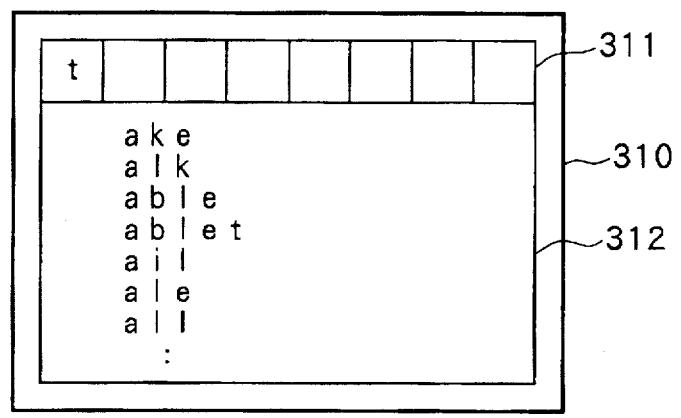
Figure 6D:
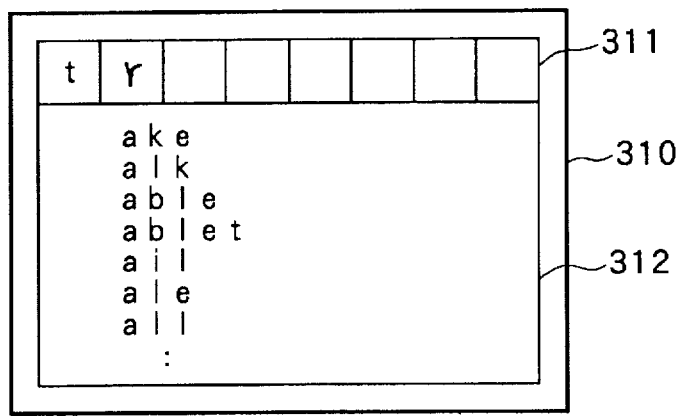
Figure 6E:
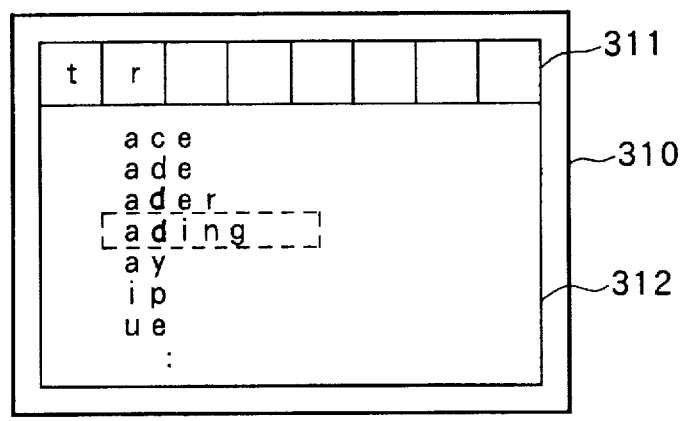
Figure 6F:
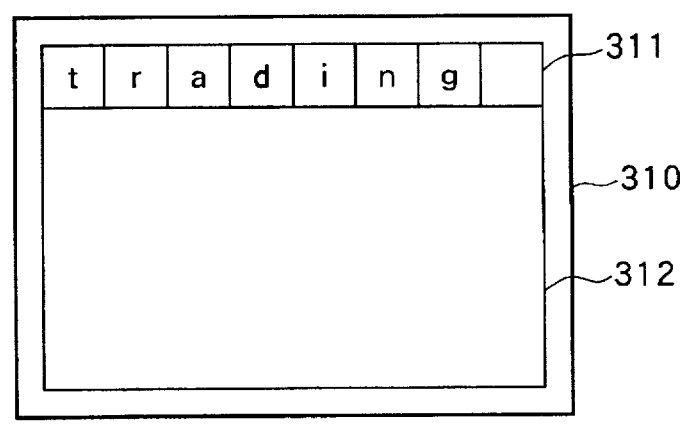

The state where "r" is written following to "t" is illustrated in FIG. 6(D). When "r" is input, the display on the input character string region 111 is varied to include the handwritten character "r". Through the process set forth above, the handwritten character "r" is recognized and the display on the input character string region 111 is changed to display encoded character codes of "tr" is displayed. Then, the character strings following "tr" are predicted by the character string predicting portion 60 and displayed on the predicted character string region 112 of the display portion 110. FIG. 6(E) shows the display at this stage. In the shown example, among the candidate character strings displayed on the predicted character string region 112, "ading" is selected by the selection command input portion 30. This corresponds to branching of the process to the YES branch at the step 411 of FIG. 4. At the step 412, selected dedicated character string "ading" is displayed on the input character string region 111 subsequent to the input characters "tr". This condition is illustrated in FIG. 6(F).

When "ading" is selected among the candidated character string in the predicted character string buffer 70, the learning control portion 160 combines the direct character string "tr" stored in the direct character string buffer 56 and the selected character string "aning" and stores the combined character string in the learning memory 140. By storing of "trading", i.e. "tr" +"ading" in the learning memory 140, when a character string of "t" or "tr" is input through the character string input portion 10 in next and subsequent character string input, "trading" stored in the learning memory 140 can be preferentially generated that the words starting from "t" or "tr" in the word dictionary 200 in generation of the predicted character string. Thus, at the stage where the user makes entry of "t" by handwriting, "trading" is displayed as a first candidate predicted character string among the predicted character strings. Therefore, efficiency in repeatedly inputting of the character string of "trading" can be improved.

While sections are defined in the input character string region 111 for respective characters in the discussion for the operation set forth above, it is not essential to provide such independent sections for displaying respective characters. Also, the configuration and the positional relationship between the input character string region 111 and predicted character string region 112 and so forth are not specified to the shown example. Furthermore, it may be possible to shift the position of the predicted character string region 112 depending upon the input characters, and to vary the size of the predicted character string region 112 depending upon the number of candidate character strings. Also, while only parts of the predicted character strings are displayed on the predicted character string region 112 in the example of FIGS. 6(A) to 6(F), it may be possible to display the candidate character strings as full spelling of words (for example, not only "ading" but also "trading" is displayed). In addition, a relationship of timings between the timing to input the next character and a timing of switching the displayed characters on the display screen may be arbitrarily selected.

On the other hand, the order of displaying of the candidate character strings may be arbitrarily determined in any order, such as the order of the character codes, order of the length of the character strings, order of preference given based on a predetermined rule, such as frequency of selection or so forth. Also, when the number of the candidate character strings are greater than a predetermined value, it may be possible not to display the candidate character strings on the predicted character string region 112 since it is unlikely the desired character string will be selected from such large number of candidates displayed on the predicted character string region 112.

Figure 7:
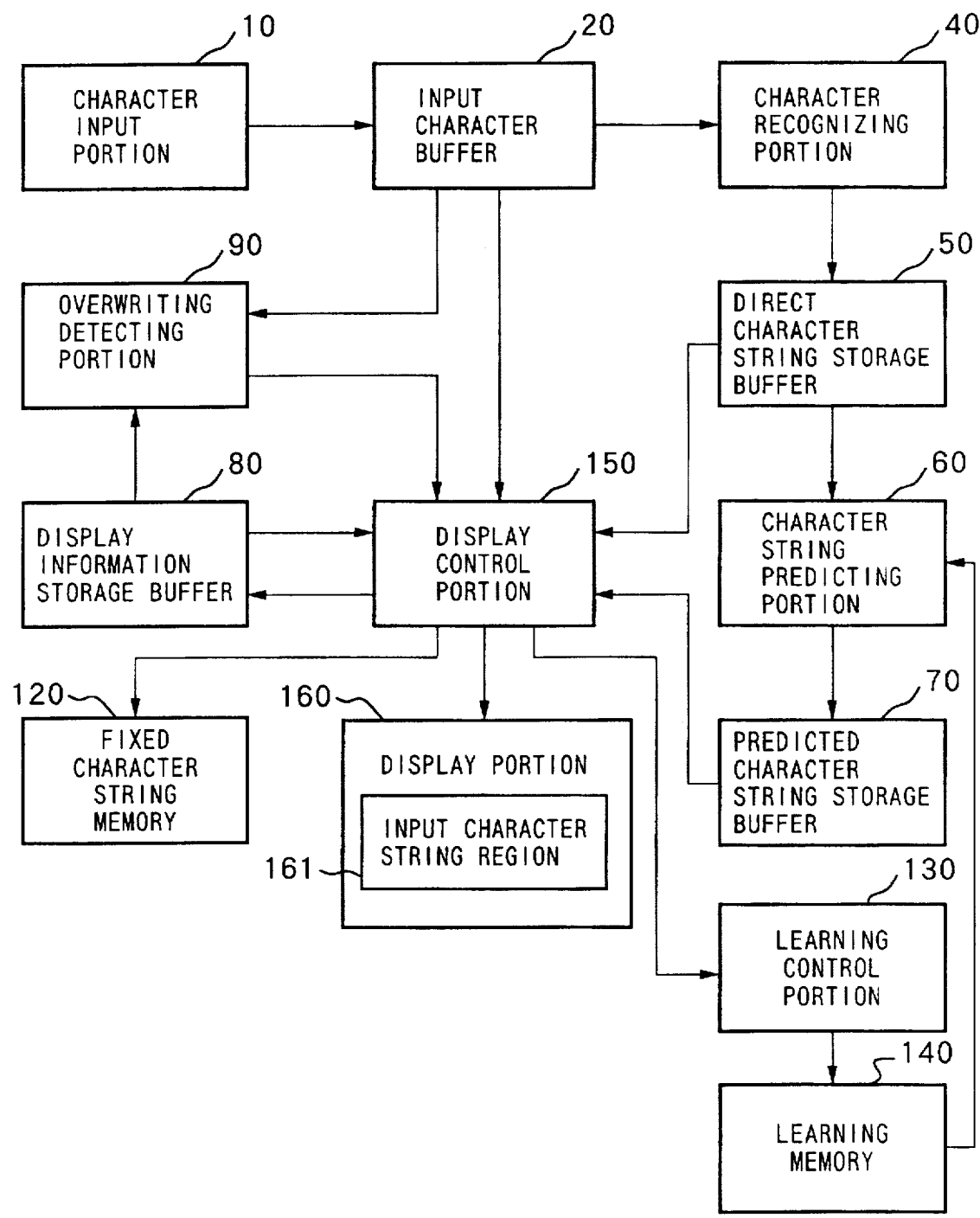
FIG. 7 is a block diagram of the second embodiment of a character string input device according to the present invention.

FIG. 7 shows a block diagram showing the construction of the fifth embodiment of the character string input system according to the present invention.

As shown in FIG. 7, the shown embodiment of the character string input system comprises a character string input portion 10 for inputting a character string, an input character buffer 20 for temporarily storing the input character string, a character recognizing portion 40 for performing character recognition of the input character, a direct character string storage buffer 50 for storing recognized character string, a character string predicting portion 60 for predicting a character string following to the character string stored in the direct character string storage buffer 50, a predicted character string storage buffer 70 for storing predicted candidates of character strings, a fixed character string memory 120 for storing a fixed character string, a learning control portion 180 and learning memory 140 for learning the fixed result of the character string, a display information storage buffer 80 for displaying character string, for which input character string processing is completed, an overwriting detecting portion 90 for detecting overwriting of the input character over the predicted character string, a display control portion 150 and a display portion 160.

Among the elements set forth above, the character input portion 10, the input character buffer 20, the character recognition portion 40, the direct character string storage buffer 50, the character string predicting portion 60, the predicted character string storage buffer 70, the display information storage buffer 80, the fixed character string memory 120, the learning control portion 130 and the learning memory 140 are the same as those of the first embodiments. The same reference numerals will be given for these elements and detailed discussion therefor is neglected for avoiding redundancy.

The display portion 160 may be realized by a CRT display, a liquid crystal display and so forth similarly to the foregoing first embodiment. Also, when the liquid crystal display tablet or touch panel is used, the character input portion 10 and the display portion 160 may be realized as a physically integrated unit. In contrast to the first embodiment, in which the display portion 110 has separated input character string region 111 and predicted character string region 112, in the shown embodiment, the display portion 160 has a single character string region 161 so that the predicted character string is displayed immediately following the input character string.

The overwriting detecting portion 90 is adapted to detect overwriting of the handwriting character input through the character input portion 10 on the position where the predicted character string of the character string region 161 of the display portion 160. The coordinate range of the predicted character strings in the character string region 161 can be obtained from the display information storage buffer 80. Accordingly, The overwriting detecting portion 90 makes comparison for the coordinate value of the trace data newly written in the input character buffer 20 with the coordinate range of the predicted character strings obtained from the display information storage buffer 80 to check whether the coordinate value of the handwritten trace is included in the coordinate range of the predicted character string. When the coordinate value of the handwritten trace is judged to be within the coordinate range of the predicted character string, an overlapping detection signal is output to a display control portion 150.

The display control portion 150 is a means for forming the content of the display information storage buffer 80 on the basis of the contents of input character buffer 20, direct character string storage buffer 50, the predicted character string storage buffer 70 and overwriting detecting portion 90 controlling the display content of the display portion 160 In concrete terms, the display control portion 100 performs controls through the following processes. At first, the trace data in the input character buffer 20 is temporarily displayed in the input character string region 161 of the display portion 160. When the operation of the character recognizing portion 40 is completed, in place of the temporarily stored trace data, the character string corresponding to the content of the direct character string storage buffer 50 is re-displayed on the input character string region 161. On the other hand, in the region subsequent to the region to display the direct character string for displaying the predicted character string, one of the predicted character string is displayed. When the overwriting detection signal is input from the overwriting detecting portion 90, the predicted character string up to that immediate before the position where the new character is overwritten are fixed as the input character string, and the predicted character strings at the overwritten position and subsequent position are deleted.

The learning control portion 130 is similar to the learning control portion 130 in the first embodiment but is different in operational timing. Namely, in the first embodiment, the fact that selection and fixing of the character string is detected by receiving the command input from the selection command input portion 30. However, since the shown embodiment does not include the selection command input portion 30, the command input cannot be received. Therefore, the shown embodiment cannot overwrite the predicted character string of the character string region 161 on the displayed position, and when the character is handwritten at the position immediately following the predicted character string, the fact that the predicted character string is fixed as the input character string, is detected to perform storing of the process history.

Figure 8:
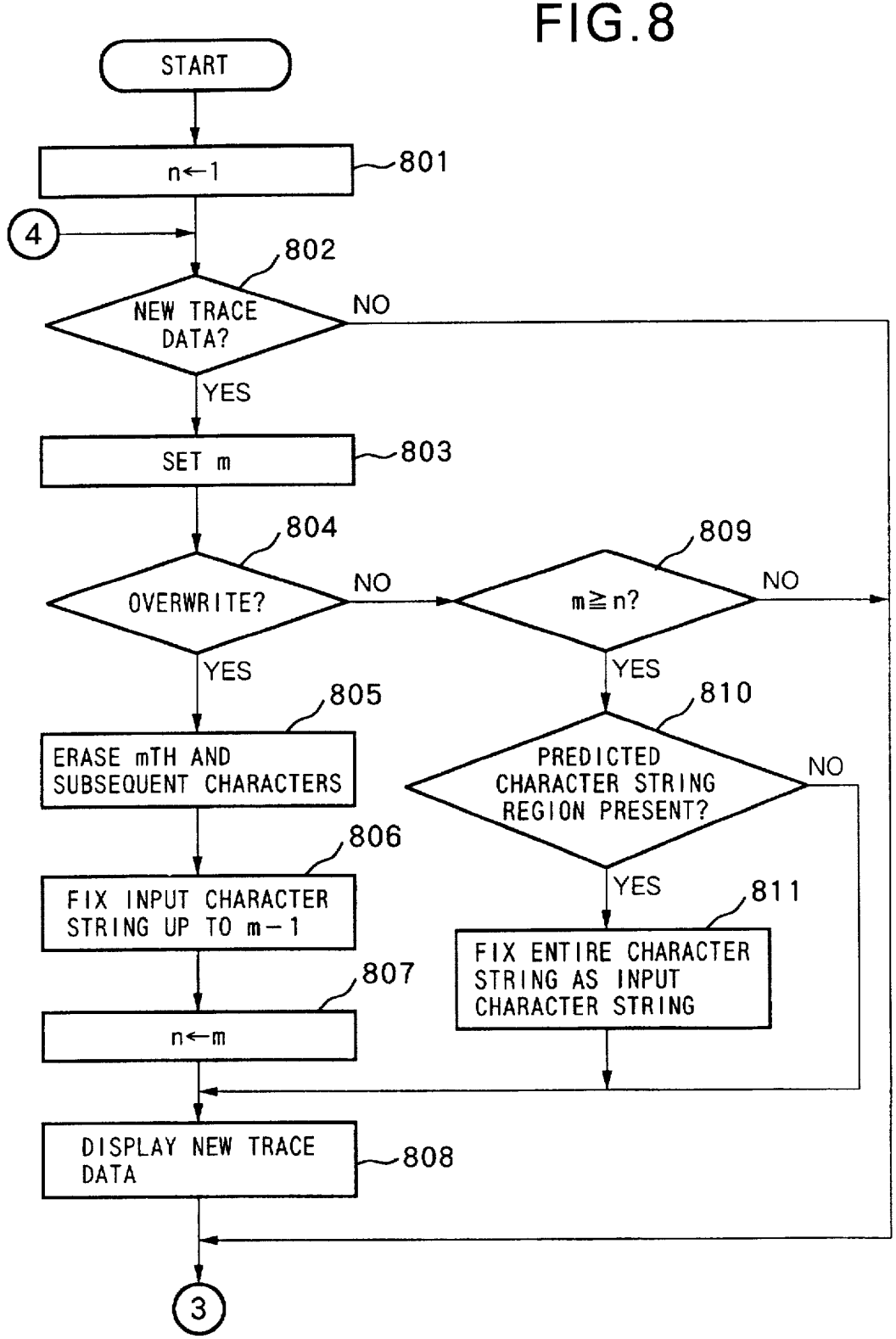
FIGS. 8 and 9 are a series of flowchart showing a operation of the second embodiment of the character string input system.
Figure 9:
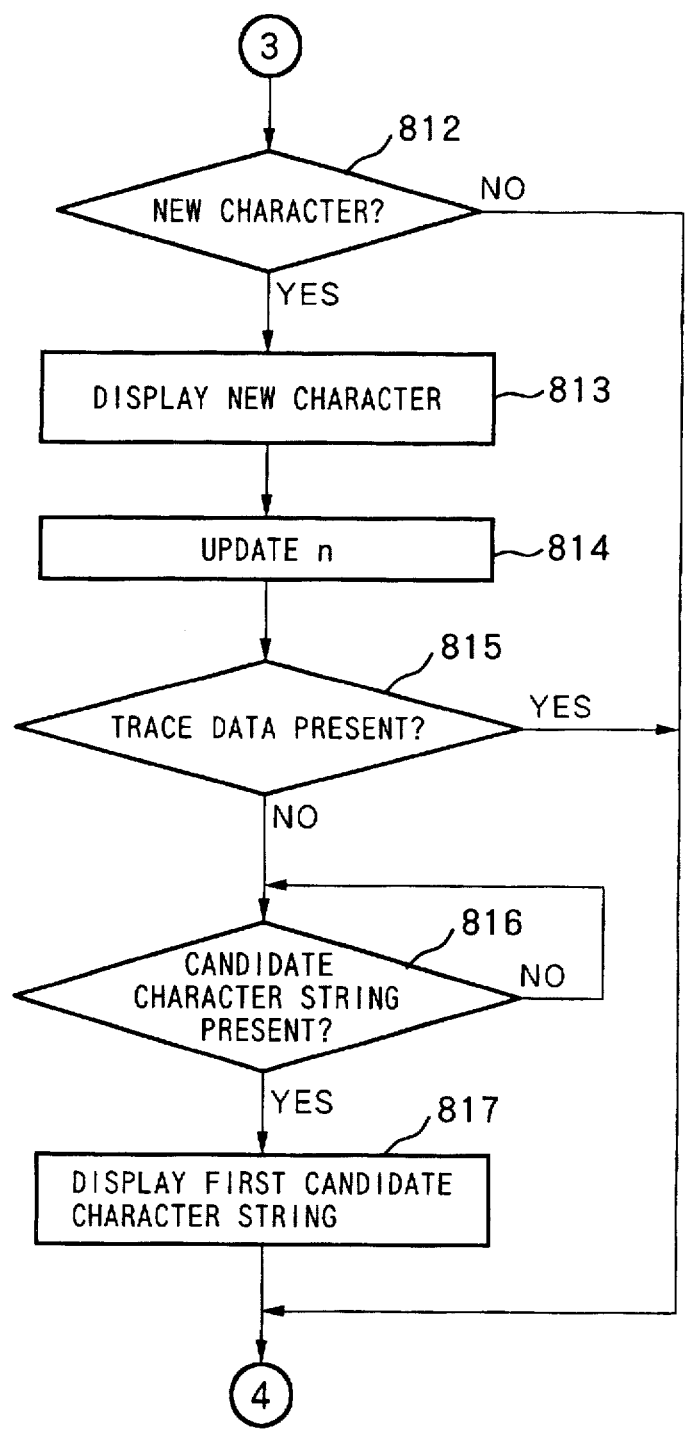

Next, the operation of the shown embodiment of the display control portion 150 will be discussed with reference to FIGS. 8 and 9.

In the drawings, the reference sign n represents a value indicative of the character concerned. Namely, when n=1, it represents the first character in the character string region 161 of the display portion 160. On the other hand, sign m represents a value indicative of the position of the input character. Accordingly, when a position where a character is already present, is represented by the sign m, it means overwriting of the new character over the existing character at the corresponding position.

At first, in the display control portion 150, the sign n is initially set at a value 1 (step 801). Then, the character input is performed by the character input portion 10, a fresh trace data is stored in the input character buffer 20. Then, the display control portion 150 sets the position of the trace data as the sign m (steps 802 and 803). Thereafter, if the overwriting detection signal is input from the overwriting detecting portion 90, it means overwriting of the new input character over the existing character of the predicted character string at the corresponding position. Therefore, the characters in the predicted character string positioned at or subsequent to the position where the input character is overwritten are deleted. Also, in conjunction therewith, the characters in the predicted character string up to the character overwritten by the newly input character are taken as input character string (steps 804, 805 and 806). Then, the values of the signs n and m are set (step 807), and new trace data is displayed on the input character string region 161 of the display portion 160 (step 808).

On the other hand, when no overwriting detection signal is input from the overwriting detecting portion 90, it means that the overwriting of the input character is not made. Then, if the sign m is equal to or greater than n and if the predicted character string is displayed on the input character string region 161 of the display portion 160, all of the predicted character string is fixed as the input character string (steps 809, 810 and 811). On the other hand, the new trace data is displayed on the input character string region 161 of the display portion 160 (step 808). When no predicted character string is displayed on display portion 160, the new trace data is displayed in the input character string region 161 of the display portion 160 as is (step 810 and 808).

Next, by the character recognition portion 40, character recognition is performed to store new character in the direct character string storage buffer 50. Then the display control portion 150 displays the new character on the input character string region 161 in place of the trace data (steps 812 and 813). At this time, the character string predicting portion 60 performs prediction for the character following the new character to store the predicted character in the predicted character string storage buffer 70.

Then, the display control portion 150 sets the character concerned to the character next to that currently concerned. Then the candidate of the character string including the currently concerned character and the subsequent characters is read out from the predicted character string storage buffer 70 (steps 814 and 815). Then, the read out predicted character string is displayed on the predicted character string region of the character string region 161 of the display portion 110 (steps 816 and 817). Thereafter, the system is placed in waiting state for waiting newly storing of the trace data in the input character string buffer 20.

The operation set forth above will be discussed in more concrete manner with reference to FIGS. 10(A) to 10(F).

Figure 10A:
FIGS. 10A to 10F are illustration showing display in inputting character string.

FIG. 10(A) shows the condition where nothing is input. As can be seen, the input character string region 161 which is not separated into the input character string region 161 and predicted character string region 112 as in the former embodiment are not provided as separate regions in the display control portion 150. For instance, the region shown by bold letters in FIGS. 10C and 10E are the display region for the predicted character string. The following discussion will be given for the process of inputting a word "tablet" through the processes.

Figure 10B:
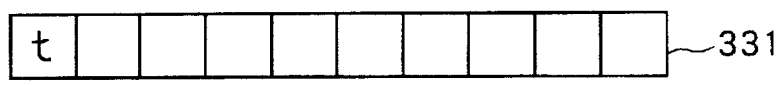
Figure 10C:
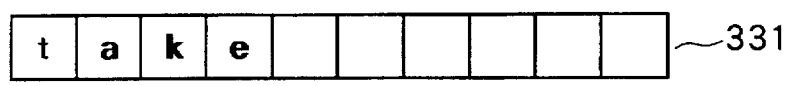

In FIG. 10(B), a character "t" is written in by handwritten manner. This is the state where the trace data is input to the input character buffer 20 from the character input portion 10 and stored therein, which is displayed through the operation of a loop of step 802 (branching to YES branch) of FIGS. 8 and 9, step 803, step 804 (branching to NO branch), step 809 (branching to YES branch, step 810 (branching to NO branch), step 808, step 812 (branching to NO branch).

When one handwritten character is entered, as the result of process in the character recognition portion 40, the character code of "t" is stored in the direct character string storage buffer 50. At this stage, the answer at the step 2105 becomes positive. Then, by the step 2106, in place of the handwritten character "t" displayed, the encoded character code "t" is displayed on the input character string region 161.

Thereafter, by the character string predicting portion 60, the character string subsequent to "t" is predicted. Then, the candidate character string or character strings are stored in the predicted character string storage buffer 70. At this stage, the process is advanced to steps 816 and 817 of FIG. 9. Then, as the first candidate character string, "ake" is displayed. The display at this stage is illustrated in FIG. 10(C). In the shown embodiment, by utilizing the bold letter for the predicted character string, the predicted character string is discriminated from the input character string. The method of providing distinction for the predicted character is not specified to the bold letter, but can be differentiated in color or in providing underline and other various methods. On the other hand, the reason why the first predicted character string is "ake" is that the first word beginning "t" is "take" in the word dictionary 200 of FIG. 2. Here, when process histories have been stored with respect to the words beginning from "t" in the learning memory 140, it is possible to display the word selected in the recent process as the first candidate with making reference to the content of the learning memory 140. Also, other than the method according to the order in the word dictionary or on the basis of the process history stored in the learning memory 140, there are various methods, e.g., method on the basis of order in the length string (predicted character string (make the longest character length as the first candidate), method taking a relationship in the meaning, and so forth.

The character string "take" predicted up to this stage is different from the intended character string "tablet". However, the predicted character string matches with the intended character string up to "ta". Therefore, it is required to re-write "ke". Namely, the second character "a" can be taken as is. Therefore, over the third character "k", "b" is overwritten. Upon starting overwriting to the display region for the predicted character string in the input character string region 161, the flowchart of FIG. 8 is executed through the steps of step 802 (branching to YES branch), the step 803, the step 804 (branching to YES branch). Then, by the step 805, the characters in the predicted character string at and subsequent to the overwritten position, i.e. "ke" are erased. Then, at the step 806, the predicted character string ("a" in the shown case) preceding the overwritten character position, are fixed as the input character string. Then, the handwritten character "b", similarly to the case of "t" in FIG. 10(B), is displayed through the loop of the step 808, 812 of FIGS. 8 and 9 (branching to NO branch), the step 802 (branching to YES branch), the step 803, the step 804 (branching to NO branch), the step 809 (branching to YES branch, the step 810 (branching to NO branch) and the step 808, as shown in FIG. 10(D).

The state where the handwritten character "b" is encoded into the character code and re-displayed and predicted character string subsequent to "b" is displayed is illustrated in FIG. 10(E). As can be seen, immediately following "tab", "le" are displayed as the predicted character string in reversed display.

Figure 10D:
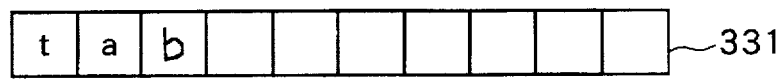
Figure 10E:
Figure 10F:
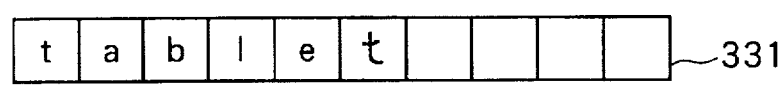

Since this character string matches with the desired character string, overwriting is not necessary as that required in the case of FIGS. 10(D) and 10(E). Therefore, at the position subsequent to "table", "t" is handwritten as a fresh character. At this time, in the flowchart of FIGS. 8 and 9, the process is performed through the step 802 (branching to YES branch), the step 803, the step 804 (branching YES branch), the step 809 (branching to YES branch), the step 810 (branching to YES branch, the step 811 and the step 808. At the stage of the step 811, "ble" displayed as the predicted character string is fixed as the input character string. Then, the handwritten character "t" is displayed at the end of the displayed character string. The display at this stage becomes as illustrated in FIG. 10(F).

When the character string "le" is fixed as input character string subsequent to "tab" as set forth above, the learning control portion 130 combines the character string "tab" stored in the direct character string buffer 50 and the fixed character string "le" and stores in the learning memory 140. By storing the combined character string "table", i.e., "tab"+"le", in the learning memory, when the character string "t", "ta" or "tab" is input in the next and subsequent character input, the word "table" stored in the learning memory 140 is preferentially generated than the words beginning from "t", "ta" or "tab" in the word directionary 200 in generation of the predicted character strings. Thus, in the next and subsequent entry of the character strings, if the user handwrites "t", the word "table" is displaced as the first candidate of the predicted character strings, and efficiency in repeatedly inputting the character string of "table" or "tablet" can be improved.

While discussion is given for the flow of the basic process, supplementary discussion will be given in the case of YES branch from the step 815 of FIG. 9. Such branching is taken when the next handwriting character "a" is written from the character string input portion 10 before encoding of the character "t" from FIG. 10(B), for example. In this case, upon encoding of the character "t", the next character has already been written. In this embodiment, prediction is performed so as not to ignore the character. Namely, in FIG. 9, steps 816 and 817 will not be executed.

It should be noted that while the example of display in FIGS. 10(A) to 10(F) has sections each accepting one character, such divided sections are not essential to the present invention similarly to the foregoing first embodiment.

Figure 11:
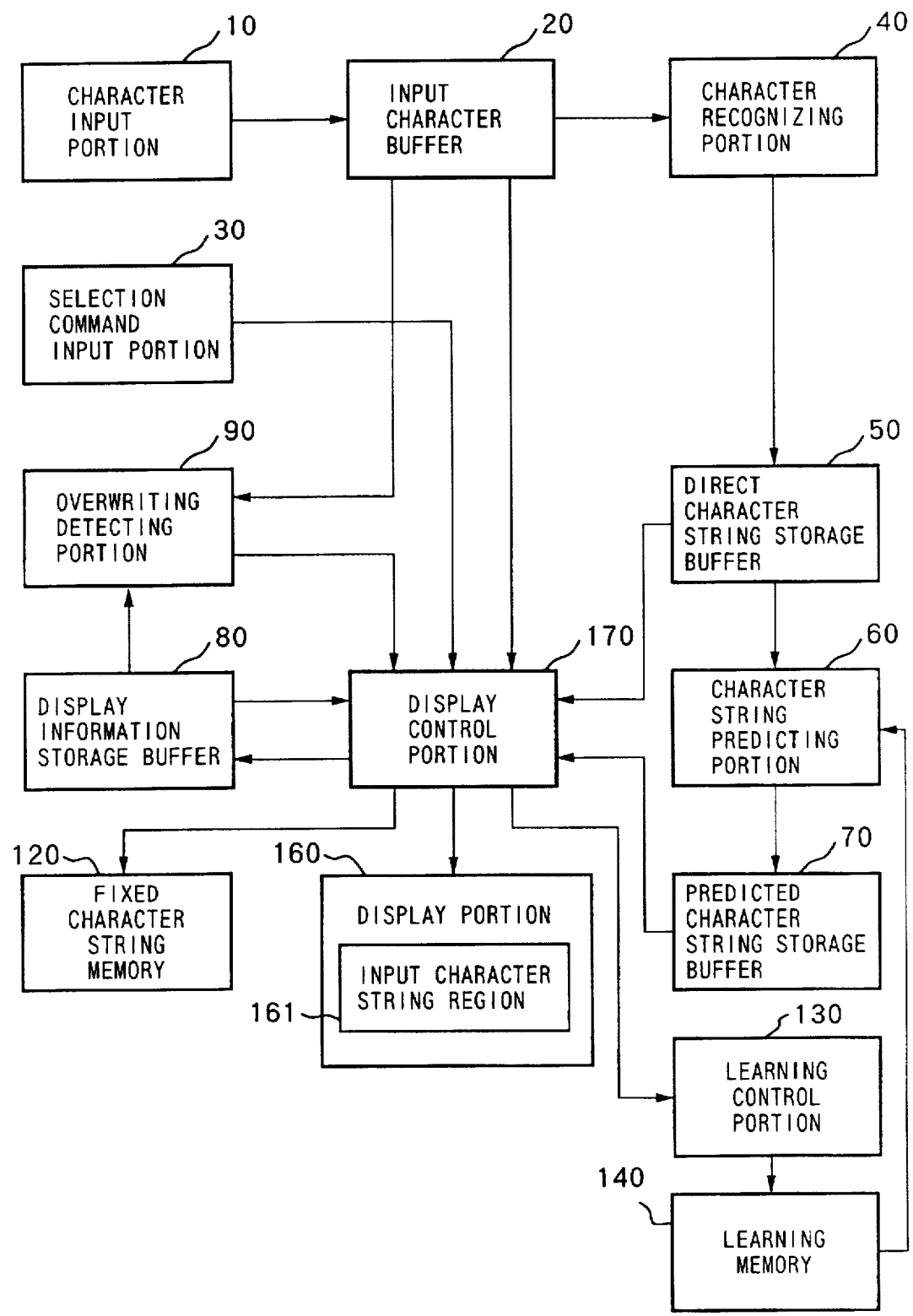
FIG. 11 is a block diagram of the third embodiment of a character string input device according to the present invention.

FIG. 11 is a block diagram showing the third embodiment of the character string input system according to the present invention.

As shown in FIG. 11, the shown embodiment of the character string input system comprises a character string input portion 10 for inputting a character string, an input character buffer 20 for temporarily storing the input character string, a selection command input portion 30 for inputting a command for selection and instruction, a character recognizing portion 40 for performing character recognition of the input character, a direct character string storage buffer 50 for storing recognized character string, a character string predicting portion 60 for predicting a character string following to the character string stored in the direct character string storage buffer 50, a predicted character string storage buffer 70 for storing predicted candidates of character strings, an overwriting detecting portion 90 for detecting overwriting of the input character over the predicted character string, a fixed character string memory 120 for storing a fixed character string, a learning control portion 130 and learning memory 140 for learning the fixed result of the character string, a display information storage buffer 80 for displaying a character string, for which input character string processing is completed, a display control portion 170 and a display portion 160.

Among the elements set forth above, the character input portion 10, the input character buffer 20, the selection command input portion 30, the character recognition portion 40, the direct character string storage buffer 50, the character string predicting portion 60, the predicted character string storage buffer 70, display information storage buffer 80 are the same as those of the first embodiments, and the overwriting detecting portion 90 and the display portion 160 are the same as those in the foregoing second embodiment. The same reference numerals will be given for these elements and detailed discussion therefor is neglected for avoiding redundancy.

The display control portion 170 is a means for forming the content of the display information storage buffer 80 on the basis of the contents of input character buffer 20, direct character string storage buffer 50, the predicted character string storage buffer 70 and overwriting detecting portion 90 controlling the display content of the display portion 160. In concrete, the display control portion 170 performs controls through the following processes.

At first, the trace data in the input character buffer 20 is temporarily display in the input character string region 161 of the display portion 160. When the operation of the character recognizing portion 40 is completed, in place of the temporarily stored trace data, the character string corresponding to the content of the direct character string storage buffer 50 is re-displayed on the input character string region 161. On the other hand, in the display region for the predicted character string of the input character string region 161, one candidate character string in the predicted character string storage buffer 70 is displayed. When a selection command for the predicted character string is input from the selection command input portion 30, another predicted character string is displayed on the display region for the predicted character string in the input character string region 161. When the overwriting detection signal is received from the overwriting detecting portion 90, the characters in the predicted character string up to immediately preceding the overwritten character are fixed as the input character string. On the other hand, the characters in the predicted character string at and subsequent to the overwritten character are erased. Namely, the process to be performed by the display control portion 170 in the shown embodiment is in addition of the display control for displaying another candidate character string in response to the selection command input against the currently displayed predicted character string, for the display control portion 150 in the second embodiment.

Figure 12:
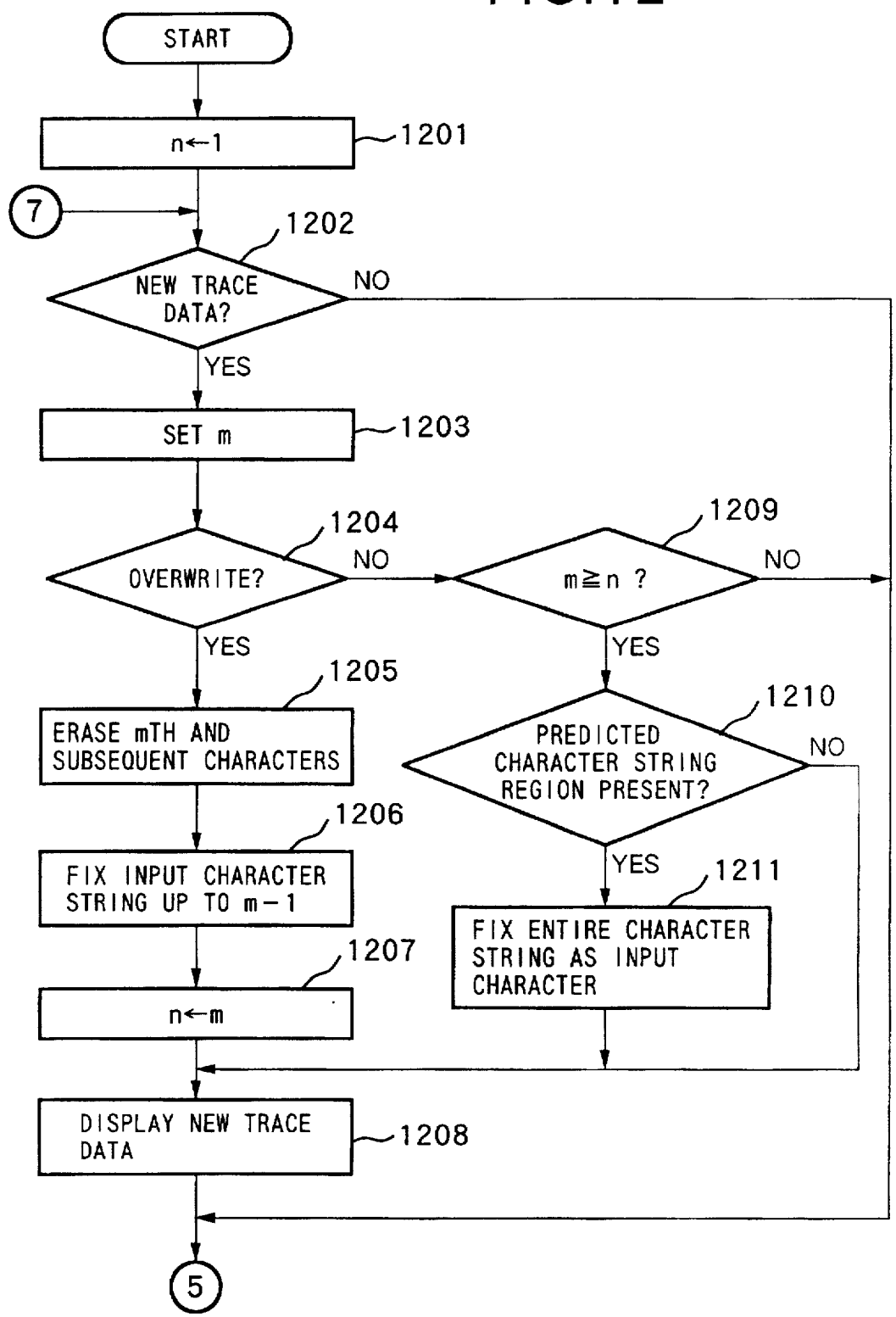
FIGS. 12 to 14 are a seperate portions of a flowchart showing an operation of the third embodiment of the character string input system.

Next, discussion will be given for operation of the display control portion 170 with reference to FIGS. 12, 13 and 14.

In the drawing, the sign n is a value indicative of the position of the character in question. Namely, when n=1, the first character in the character string region 161 of the display portion 160 is the character in question. On the other hand, the sign m is a value indicative of the position of the input character. Accordingly, when the position to display the character has already been set as the sign m, it means that the new character is overwritten on the corresponding character position.

At first, in the display control portion 170, the sign n is initially set at a value 1 (step 1201). Then, the character input is performed by the character input portion 10, a fresh trace data is stored in the input character buffer 20. Then, the display control portion 150 sets the position of the trace data as the sign m (steps 1202 and 1203). Thereafter, if the overwriting detection signal is input from the overwriting detecting portion 90, it means overwriting of the new input character over the existing character of the predicted character string at the corresponding position. Therefore, the characters in the predicted character string positioned at or subsequent to the position where the input character is overwritten are deleted. Also, in conjunction therewith, the characters in the predicted character string up to the character overwritten by the newly input character are taken as input character string (steps 1204, 1205 and 1206). Then, the values of the signs n and m are set (step 1207), and new trace data is displayed on the input character string region 161 of the display portion 160 (step 1208).

On the other hand, when no overwriting detection signal is input from the overwriting detecting portion 90, it means that the overwriting of the input character is not made. Then, if the sign m is equal to or greater than n and if the predicted character string is displayed on the input character string region 161 of the display portion 160, all of the predicted character string is fixed as the input character string (steps 1209, 1210 and 1211). On the other hand, the new trace data is displayed on the input character string region 161 of the display portion 160 (step 1208). When no predicted character string is displayed on display portion 160, the new trace data is displayed in the input character string region 161 of the display portion 160 as is (step 1210 and 1208).

Next, by the character recognition portion 40, character recognition is performed to store a new character in the direct character string storage buffer 50. Then the display control portion 170 displays the new character on the input character string region 161 in place of the trace data (steps 1212 and 1213). At this time, the character string predicting portion 60 performs prediction for the character following the new character to store the predicted character in the predicted character string storage buffer 70.

Subsequently, the display control portion 170 shifts the focused position n to the position next to the currently focused position. Then, the candidate character string following to the newly focused position is read out from the predicted character string buffer 70 (steps 1214 and 1215). Then, the read out predicted character string is displayed in the display region of the predicted character string of the character string region 161 of the display portion 160, namely in the region immediately after the region where the input character string is displayed (steps 1216 and 1217). Then, the system is placed in the stand-by state to wait for new trace data stored in the input character string buffer 20.

The shown embodiment of the display control portion 170 displays another candidate predicted character string in the display region of the predicted character string of the character string region 161 when the selection command is input from the predicted character string from the selection command input portion 30 (steps 1218, 1219 of FIG. 14) after displaying the first candidate of the predicted character string in the character string region 161 of the display portion 160 (step 1217).

Figure 15A:
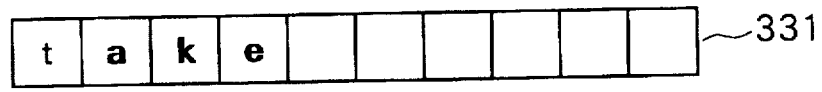
FIGS. 15A to 15E are illustration showing display in inputting character string.
Figure 15B:
Figure 15C:
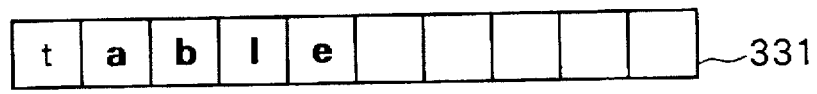
Figure 15D:
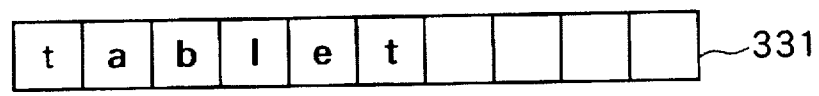
Figure 15E:
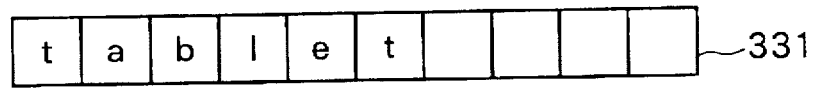

The state of the input character string region 161 as illustrated in FIG. 15(A) corresponds to the state of the input character string region 161 as shown in FIG. 10(C). At this condition, when the selection command for selecting the candidate character string is input from the selection command input portion 30, another candidate character string is displayed on the display region for the predicted character string of the input character string region 161. Another predicted character string may be obtained from the predicted character string storage buffer 70. In the example of display in FIGS. 15A to 15E, the order of the candidate character strings is adapted to the order of the words in the word dictionary 200 of FIG. 2. The candidate character string is varied from "ake" to "alk". Then, at every occurrence of the candidate character string, the content of display in the input character string region 161 (candidate character string) is varied. At the stage of FIG. 15(D), the desired predicted character string has been attained.

It should be noted, upon providing the selection command of the candidate character string, it may be possible to designate the predicted character string together with the position thereof. For instance, with respect to the direct character string "t", consideration is given that the candidate character string is "ake". At this time, in the discussion for the former embodiment, as the candidate character strings, all of the words having "t" as the leading character in the word dictionary 400 of FIG. 6, may correspond. With respect to this, by selection command for the predicted character string, the position in the character string "b" in the character string region is given. Then it is possible to perform display control for the candidate character string with fixing the portion preceding the position of the character "b". In a case, in terms of the word dictionary 200 of FIG. 2, only words beginning from "ta" can be the candidate character string.

On the other hand, from the selection command input portion 30, not only the selection command for the predicted character string, but also the selection command for the input character string may be input. In such a case, for the selection command of the input character string region, another candidate character generated by the character recognition portion 40 may be displayed. It may be possible to obtain another candidate character in the character recognition portion 40, from the direct character string storage buffer 50.

In the foregoing embodiment, as a method for realizing the character string predicting portion 60, a method to make reference to the word dictionary for retrieving partially matching character strings, such method only permits prediction for the trailing part of the character string. However, the character string predicting portion 60 may be realized by various methods.

For example, instead of employing the word dictionary, prediction of the character string may be performed by utilizing certainty connection on a character to character basis. It may be possible to check frequency of occurrence of certain combination of the characters by investigating a large amount of phrases. On the basis of the results of investigation, a list of the characters having high certainty will appear following a certain character. On the basis of the certainty of connection for the certain character, the order of the character having high frequency of appearance following to the certain character can be derived to generate the predicted character string.

On the other hand, there is a method to use a simultaneously appearing certainty of the words. Also, the certainty of simultaneous occurrence may be sorted by possibility of simultaneous occurrence or by similarity of the meaning.

Also, it is possible to make the character strings to be easily connected in view of a part of speech as the predicted character strings. For instance, suffix, such as "er", "ing", "ed" immediately after verb is easily connected, these character strings may be the predicted character string. In such case, according to the rule of grammar, some of the suffixes may be avoided from the predicted character strings. A part of speech which can immediately follow a certain part of speech can be obtained by utilizing a connection table (table describing whether two words or speeches can be connected) to be used for the conventionally known morphological analyzer. Furthermore, prediction based on sentence pattern, grammatical construction pattern and so forth can also be possible.

Furthermore, when prediction is to be performed by partial matching collation of the predicted character string and the word dictionary or the character string dictionary, it is one of factor determining appropriateness of prediction which range from the trailing end of the direct character string is made as a target for partial matching. When a phrase is sequentially input, it is possible that relatively long character string is stored in the direct character string buffer 50. In such a case, difficulty may often caused in prediction with taking all of the direct character string as target for the partial matching collation. Therefore, by detecting space, comma or so forth input per words, the character string positioned following to the space, comma or so forth becomes an object for partial matching collation, partial matching collation can be performed within an appropriate range.

In the foregoing three embodiments, as a hysteresis information to be stored in the learning memory 140, the combination of the character string in the predicted character string buffer 70 and the partial character string corresponding to the direct character string buffer 50 is stored when the predicted character string is fixed as the input character. However, the information effective as hysteresis information is not limited to this but can store other information. For example, combination of the predetermined words, such as an idiom and so forth can be stored as hysteresis information. It is further possible to store the character string including a sing, such as comma, period and so forth, as the hysteresis information.

Figure 5:
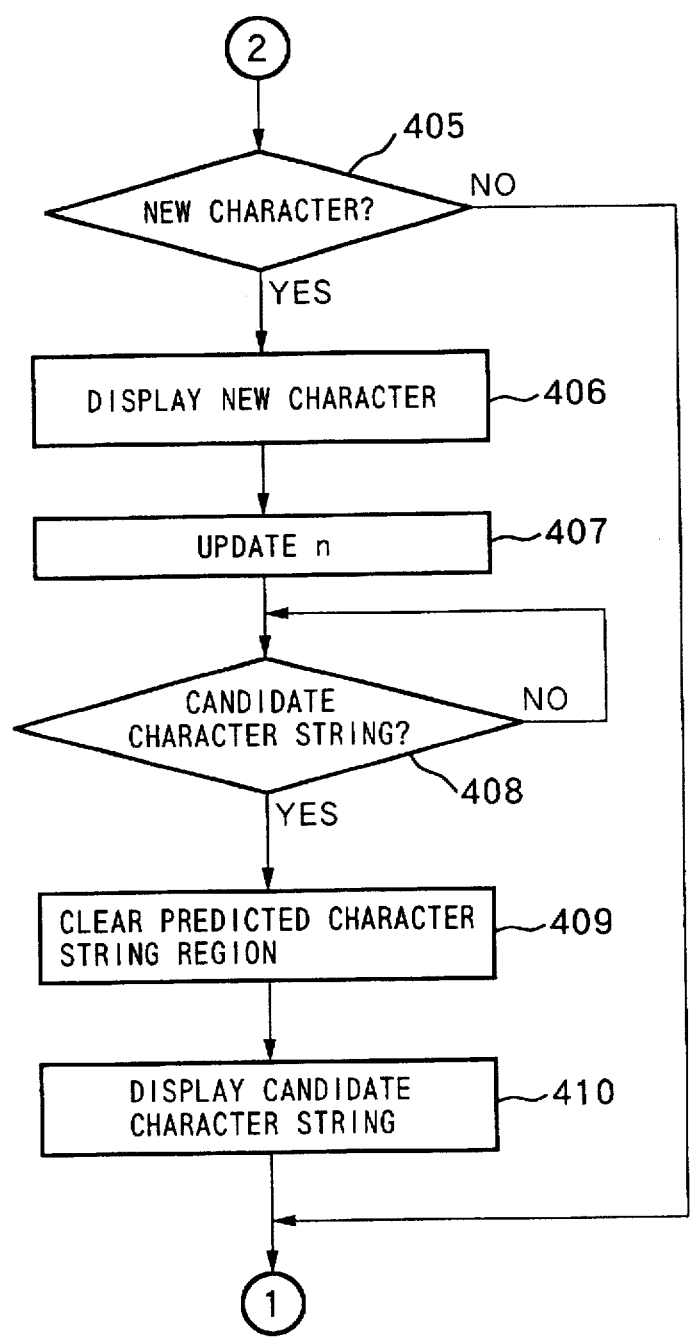
Figure 13:
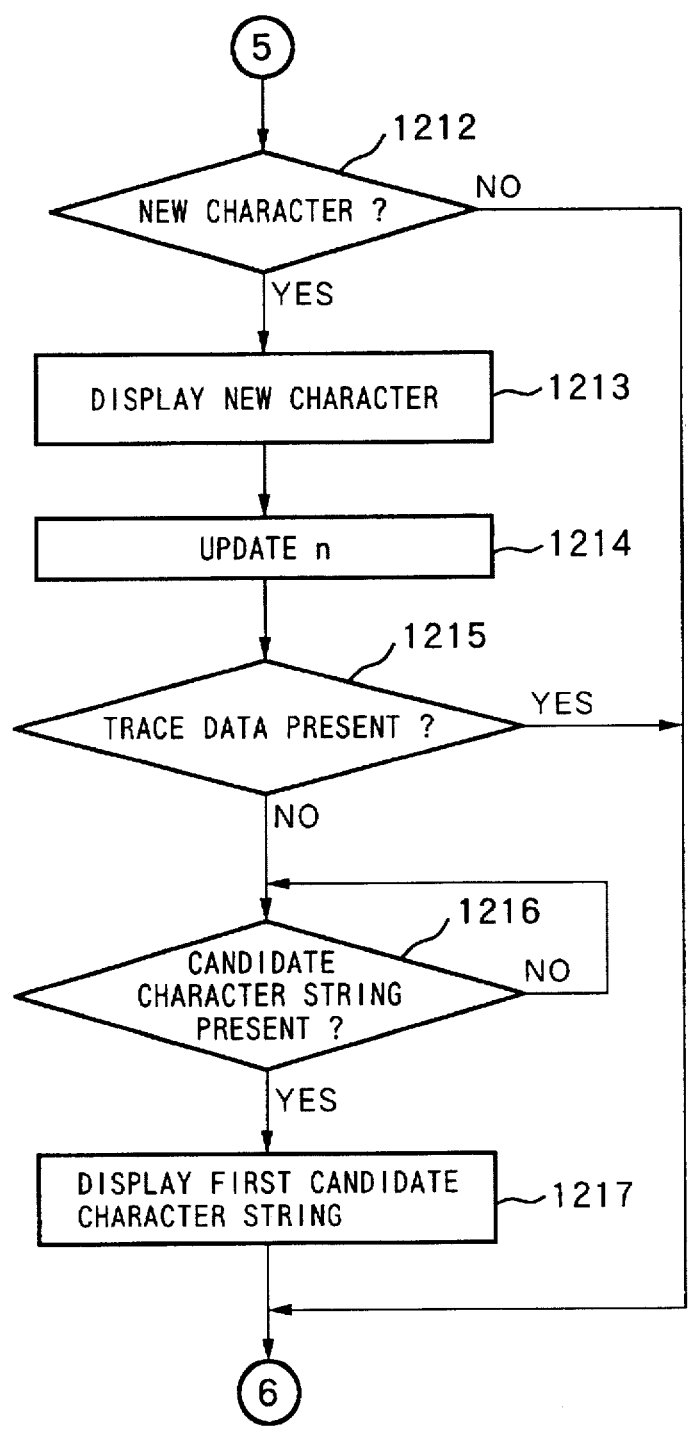
Figure 14:
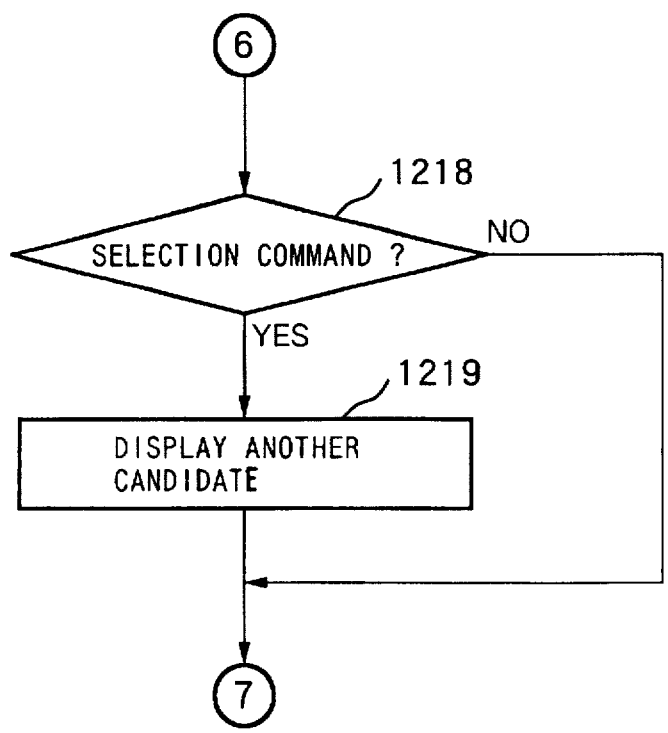

It should be noted that, in the operation of the display control portion in the process of the step 408 of FIG. 5 or the step 816 of FIG. 13, it is possible to form a infinite loop when the character string predicting portion 60 cannot generate any candidate character string. This possibility may be avoided by providing a function to set a dummy candidate character string in the predicted character string storage buffer 70 when the character string predicting portion 60 cannot generate any candidate character sting, for example. Also, the process in the step 408 or the step 816 may be modified to branch depending upon presence and absence of the candidate character string. The flowcharts illustrated in FIGS. 4, 5, 8, 9, 12, 13 and 14 should be understood as mere examples and the present invention should not be understood to be limited to the shown processes.

As set forth above, according to the shown embodiments, for the character string input system, particularly of the type, in which the character is input by character recognition of the handwritten character, input speed and input efficiency of the character string can be remarkably improved.

Also, according to the present invention, number of characters to be handwritten can be significantly reduced. This contributes reduction of possibility of erroneous recognition of the character in the character recognition. Therefore, reduction of number of handwritten characters significantly advantageous in view of efficiency of input.

Also, since the neglected portion can be supplemented without requiring positive indication of the portion of the character string where one or more characters are neglected, input efficiency can be further improved.

Also, in the shown embodiment, when the predicted character string does not match the desired character string to be input, the portion partially matching may be used as input characters. Furthermore, in the shown embodiment, since the subsequent part of the character string can be automatically erased upon occurrence of overwriting, erasure of the unnecessary character on a one by one basis can be avoided.

While the present invention has been discussed in terms of the character string input system, in which inputting of character string is performed by character recognition for the handwritten character string, the present invention may be applicable for the character input system utilizing the keyboard and so forth in inputting a large amount of character strings.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodied within a scope encompassed and equivalents thereof with respect to the features set out in the appended claims.

What is claimed is:

1. A character string input system comprising:

direct character string storage means for storing a character coded direct character string;

character string predicting means for generating predicted character strings immediately following the character string stored in said direct character string storage means;

predicted character string storage means for storing predicted character strings generated by said character string predicting means;

display means for displaying said direct character string stored in said direct character string storage means and said predicted character strings stored in said predicted character string storage means;

character string selection means for selecting a desired one of said predicted character strings among said predicted character strings stored in said predicted character string storage means; and learning means for storing a result of the selection by said character string selection means as hysteresis information to be referenced upon generation of future candidate character strings by said character string predicting means, wherein said character string predicting means generates words immediately following the character string as respective ones of said predicted character strings on the basis of a simultaneous appearing certainty of the words with respect to a word corresponding to the character string, and wherein said character string predicting means generates portions of words as the respective ones of the predicted character strings to be concatenated with the character string as single words on the basis of certainty of connection of characters in the character string and characters in the predicted character strings, the certainty of connection being performed on a character by character basis.

2. A character string input system as set forth in claim 1, wherein said hysteresis information stored in said learning means is a character string, in which the direct character string stored in said direct character string storing means and the character string stored in said predicted character string storage means and selected by said character string selection means by a selection command, are combined.

3. A character string input system as set forth in claim 1, wherein said character string selection means is a selection command input means for inputting a selection command selecting an arbitrary character string among predicted character strings stored in said predicted character string storage means.

4. A character string input system as set forth in claim 3, wherein said display means has a first display region displaying the direct character string stored in said direct character string storage means and a second display region displaying predicted character string stored in said predicted character string storage means.

5. A character string input system as set forth in claim 4, wherein said display means displays a character string selected by said character string selection means among candidate character strings stored in said predicted character string storage means at a position immediately following the direct character string displayed in said first display region.

6. A character string input system comprising:

handwriting character input means for sampling trace data of handwritten characters;

character recognizing means for recognizing a character of the sampled trace data to derive a corresponding character code;

direct character string storage means for storing a character coded direct character string corresponding to at least one character code received from the character recognition means;

character string predicting means for generating predicted character strings immediately following the character string stored in said direct character string storage means;

predicted character string storage means for storing predicted character strings generated by said character string predicting means;

display means for displaying said direct character string stored in said direct character string storage means and said predicted character strings stored in said predicted character string storage means;

character string selection means for selecting a desired one of said predicted character strings among said predicted character strings stored in said predicted character string storage means; and learning means for storing a result of the selection by said character string selection means as hysteresis information to be referenced upon generation of future candidate character strings by said character string predicting means, wherein said character string predicting means generates words immediately following the character string as respective ones of said predicted character strings on the basis of a simultaneous appearing certainty of the words with respect to a word corresponding to the character string, and wherein said character string predicting means generates portions of words as the respective ones of the predicted character strings to be concatenated with the character string as single words on the basis of certainty of connection of characters in the character string and characters in the predicted character strings, the certainty of connection being performed on a character by character basis.

7. A character string input system as set forth in claim 6 wherein said hysteresis information stored in said learning means is a character string, in which the direct character string stored in said direct character string storing means and the character string stored in said predicted character string storage means and selected by said character string selection means by a selection command, are combined.

8. A character string input system as set forth in claim 6, wherein said character string selection means is a selection command input means for inputting a selection command selecting an arbitrary character string among predicted character strings stored in said predicted character string storage means.

9. A character string input system as set forth in claim 8, wherein said display means has a first display region displaying the direct character string stored in said direct character string storage means and a second display region displaying predicted character string stored in said predicted character string storage means.

10. A character string input system as set forth in claim 9, wherein said display means displays a character string selected by said character string selection means among candidate character string stored in said predicted character string storage means at a position immediately following the direct character string displayed in said first display region.

11. A character string input system as set forth in claim 6, wherein said display means displays the predicted character string stored in said predicted character string storage means at a position immediately following said direct character string stored in said direct character string storage means.

12. A character string input system as set forth in claim 11, wherein said character string selection means is selection command input means for inputting a selection command selecting arbitrary character string among predicted character strings stored in said predicted character string storage means.

13. A character string input system comprising:

handwriting character input means for sampling trace data of handwritten characters;

character recognition means for recognizing a character of the sampled trace data to derive a corresponding character code;

direct character string storage means for storing a character coded direct character string corresponding to at least one character code received from the character recognition means;

character string predicting means for generating predicted character strings immediately following the character string stored in said direct character string storage means;

predicted character string storage means for storing predicted character strings generated by said character string predicting means;

display means for displaying said direct character string stored in said direct character string storage means and said predicted character strings stored in said predicted character string storage means;

character string selection means for selecting a desired one of said predicted character strings among said predicted character strings stored in said predicted character string storage means; and learning means for storing a result of the selection by said character string selection means as hysteresis information to be referenced upon generation of future candidate character strings by said character string predicting means, wherein said display means displays one of the predicted character strings stored in said predicted character string storage means at a first region on said display means that immediately follows a second region in which said direct character string is displayed, said one of said predicted character strings and said character string appearing as a concatenated character string on said display means.

14. A character string input system as set forth in claim 13, wherein said character string selection means selects said one of said predicted character strings up to a position immediately before said trace data is input as data to be displayed on the first region of said display means, and wherein when an additional character of the sampled trace data is recognized by said character recognition means, said display means overwrites the additional character on the display means where a first character of said one of said predicted character strings was previously displayed on said display means.

15. A character string input system as set forth in claim 13, wherein said character string selection means includes selection command input means for inputting a selection command for selecting any one of said predicted character strings that are stored in said predicted character string storage means, and wherein when an additional character of the sampled trace data is recognized by said character recognition means, said display means overwrites the additional character on the display means where a first character of said one of said predicted character strings was previously displayed on said display means.

16. A character string input system as set forth in claim 1, wherein said predicted character strings are displayed on said display means in a priority order, with highest priority given to most recent selections of said predicted character strings by said character string selection means that have preambles that match said character string, and wherein others of said predicted character strings are displayed on an alphabetic basis on said display means after said matched recent selections of said predicted character strings.

17. A character string input system as set forth in claim 6, wherein said predicted character strings are displayed on said display means in a priority order, with highest priority given to most recent selections of said predicted character strings by said character string selection means that have preambles that match said character string, and wherein others of said predicted character strings are displayed on an alphabetic basis on said display means after said matched most recent selections of said predicted character strings.

18. A character string input system as set forth in claim 15, wherein said display means is operable to display, upon an input from an operator, a next most likely one of said predicted character strings up to a position immediately before said trace data is input together with said character string on said display means as a concatenated character string.

* * * * *